(12) United States Patent
Kokubo et al.

(10) Patent No.: US 8,899,197 B2
(45) Date of Patent: Dec. 2, 2014

(54) VALVE-TIMING CONTROL APPARATUS FOR INTERNAL COMBUSTION ENGINE

(75) Inventors: Naoki Kokubo, Hiratsuka (JP); Shinichi Kawada, Isehara (JP); Seiji Tsuruta, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 507 days.

(21) Appl. No.: 13/078,016

(22) Filed: Apr. 1, 2011

(65) Prior Publication Data

US 2011/0253085 A1 Oct. 20, 2011

(30) Foreign Application Priority Data

Apr. 20, 2010 (JP) ................... 2010-096581

(51) Int. Cl.
*F01L 1/34* (2006.01)
*H02K 11/00* (2006.01)
*F01L 1/352* (2006.01)

(52) U.S. Cl.
CPC ............ *H02K 11/0021* (2013.01); *F01L 1/352* (2013.01); *F01L 1/34* (2013.01)
USPC ..................................................... 123/90.17

(58) Field of Classification Search
USPC .......................................... 123/90.15, 90.17
See application file for complete search history.

(56) References Cited

U.S. PATENT DOCUMENTS

| | | | | |
|---|---|---|---|---|
| 6,268,669 B1* | 7/2001 | Wakao et al. | ............... | 310/67 R |
| 6,302,073 B1* | 10/2001 | Heer | ........................... | 123/90.17 |
| 7,193,343 B2* | 3/2007 | Tsuge et al. | ................ | 310/68 B |
| 7,255,078 B2* | 8/2007 | Yoshijima et al. | ......... | 123/90.38 |
| 7,339,294 B2* | 3/2008 | Oohashi et al. | ............. | 310/68 B |
| 7,827,948 B2* | 11/2010 | Kokubo et al. | ............. | 123/90.17 |
| 2005/0193804 A1* | 9/2005 | Kokubo | ........................ | 73/35.12 |
| 2005/0199201 A1* | 9/2005 | Schafer et al. | ............. | 123/90.17 |
| 2009/0090322 A1* | 4/2009 | Kokubo et al. | ............. | 123/90.17 |
| 2009/0199807 A1* | 8/2009 | Schafer et al. | ............. | 123/182.1 |
| 2010/0235067 A1* | 9/2010 | Nomura et al. | ................ | 701/103 |
| 2010/0236523 A1* | 9/2010 | Saruwatari et al. | ........... | 123/436 |

(Continued)

FOREIGN PATENT DOCUMENTS

| | | |
|---|---|---|
| JP | 11-107718 | 4/1999 |
| JP | 2008-118779 | 5/2008 |

*Primary Examiner* — Zelalem Eshete
*Assistant Examiner* — Steven D Shipe
(74) *Attorney, Agent, or Firm* — Antonelli, Terry, Stout & Kraus, LLP.

(57) ABSTRACT

A valve-timing control apparatus includes a drive rotator configured to receive a rotation from a crankshaft; a driven rotator fixed to a cam shaft; and an electric motor. The electric motor includes a stator fixed to the driven rotator, a rotor that rotates relative to the stator, a coil provided to at least one of the stator and the rotor, and a motor output shaft fixed to the rotor. The valve-timing control apparatus further includes a speed-reduction mechanism; a slip ring provided to one of the drive rotator and a fixed member, and configured to feed power to the coil; a power-feeding brush provided to another of the drive rotator and the fixed member, and abutting on the slip ring; a detection-target section provided to one of the fixed member and the motor output shaft, and located on an inner circumferential side beyond a contact portion between the slip ring and the power-feeding brush; and a detecting section provided to another of the fixed member and the motor output shaft, and configured to detect a rotational position of the motor output shaft by detecting a position of the detection-target section.

14 Claims, 10 Drawing Sheets

(56) References Cited

U.S. PATENT DOCUMENTS

| | | |
|---|---|---|
| 2010/0288216 A1* | 11/2010 | Takahashi et al. ......... 123/90.17 |
| 2011/0000450 A1* | 1/2011 | Shiino et al. ............... 123/90.17 |
| 2011/0036319 A1* | 2/2011 | Kameda et al. ............ 123/90.17 |
| 2011/0100312 A1* | 5/2011 | Hirata ........................ 123/90.17 |
| 2011/0253085 A1* | 10/2011 | Kokubo et al. ............ 123/90.17 |
| 2012/0186548 A1* | 7/2012 | David et al. ................ 123/90.17 |
| 2012/0291729 A1* | 11/2012 | David et al. ................ 123/90.15 |
| 2012/0312258 A1* | 12/2012 | Kimus et al. ............... 123/90.15 |
| 2013/0008398 A1* | 1/2013 | Stoltz-Douchet et al. . 123/90.15 |
| 2013/0019825 A1* | 1/2013 | Fischer ...................... 123/90.15 |

* cited by examiner

VALVE-TIMING CONTROL APPARATUS FOR INTERNAL COMBUSTION ENGINE

BACKGROUND OF THE INVENTION

The present invention relates to a valve-timing control apparatus for an internal combustion engine, in which opening and closing timings of intake valve and/or exhaust valve of the internal combustion engine are variably controlled.

Japanese Patent Application Publication No. 2008-118779 discloses a previously-proposed valve-timing control apparatus for an internal combustion engine. In this technique, an electric motor is driven in order to improve control responsivity and controllability.

In the above previously-proposed valve-timing control apparatus, a rotation of rotor of a brushless DC motor (electric motor) is transmitted to a cam shaft by using a speed reducer of planetary gear type, and a rotational position of the rotor which has a large number of revolutions per unit time is sensed in order to detect an accurate rotational position of the cam shaft. Particularly, since the rotational position of the cam shaft can be frequently detected even in a low-rotational-speed region of engine such as at the time of engine start, for example, a startability of engine is improved in the cases of a vehicle equipped with idling-stop function and a vehicle of hybrid type.

SUMMARY OF THE INVENTION

However, in the above previously-proposed valve-timing control apparatus, the brushless DC motor is used as the electric motor, and a stator of the brushless DC motor is fixed to the internal combustion engine. Moreover, the rotor of the brushless DC motor rotates through the speed reducer, together with a sprocket to which a rotational force is transmitted from a crankshaft. Since the rotor always rotates relative to the stator when the engine is in operation, there is a problem that a consumption energy of the engine becomes large.

It is therefore an object of the present invention to provide a valve-timing control apparatus for an internal combustion engine, devised to reduce the consumption energy of the engine while improving a detection accuracy of the rotational position of cam shaft.

According to one aspect of the present invention, there is provided a valve-timing control apparatus for an internal combustion engine, comprising: a drive rotating member configured to receive a rotational force from a crankshaft; a driven rotating member fixed to a cam shaft; an electric motor including a stator fixed to the driven rotating member, a rotor configured to rotate relative to the stator, a coil provided to at least one of the stator and the rotor and configured to rotate the rotor relative to the stator by energization, and a motor output shaft fixed to the rotor; a speed-reduction mechanism configured to reduce a rotational speed of the motor output shaft and to transmit the reduced rotational speed of the motor output shaft to the driven rotating member; a slip ring provided to one of the drive rotating member and a fixed member facing the drive rotating member, and configured to feed electric power to the coil; a power-feeding brush provided to another of the drive rotating member and the fixed member, and being in contact with the slip ring; a detection-target section provided to one of the fixed member and a tip side of the motor output shaft, and located on an inner circumferential side beyond a contact portion between the slip ring and the power-feeding brush; and a detecting section provided to another of the fixed member and the tip side of the motor output shaft, and configured to detect a rotational position of the motor output shaft by detecting a position of the detection-target section.

According to another aspect of the present invention, there is provided a valve-timing control apparatus for an internal combustion engine, comprising: a drive rotating member configured to receive a rotational force from a crankshaft; a driven rotating member fixed to a cam shaft; an electric motor including a stator fixed to the driven rotating member, a rotor configured to rotate relative to the stator, a plurality of coils provided to rotate integrally with the rotor and configured to form different magnetic poles in a circumferential direction of the rotor by energization, a commutator configured to switch an energized state of the coils, a power switching brush provided to the drive rotating member and abutting on the commutator, and a motor output shaft fixed to the rotor, and configured to be rotated by energizing the coils through the power switching brush and the commutator; a speed-reduction mechanism configured to reduce a rotational speed of the motor output shaft and to transmit the reduced rotational speed of the motor output shaft to the driven rotating member; a detection-target section provided to one of the fixed member and a tip side of the motor output shaft, and located on an inner circumferential side beyond a contact portion between the commutator and the power switching brush; and a detecting section provided to another of the fixed member and the tip side of the motor output shaft, and configured to detect a rotational position of the motor output shaft by detecting a position of the detection-target section.

According to still another aspect of the present invention, there is provided a valve-timing control apparatus for an internal combustion engine, comprising: a drive rotating member configured to receive a rotational force from a crankshaft; a driven rotating member fixed to a cam shaft; an electric motor including a stator fixed to the driven rotating member, a rotor configured to rotate relative to the stator, a plurality of coils provided to rotate integrally with the rotor and configured to form different magnetic poles in a circumferential direction of the rotor by energization, a commutator configured to switch an energized state of the coils, a power switching brush provided to the drive rotating member and abutting on the commutator, and a motor output shaft fixed to the rotor, and configured to be rotated by energizing the coils through the power switching brush and the commutator; a speed-reduction mechanism configured to reduce a rotational speed of the motor output shaft and to transmit the reduced rotational speed of the motor output shaft to the driven rotating member; a slip ring provided to one of the drive rotating member and a fixed member facing the drive rotating member, and configured to feed electric power to the power switching brush; and a power-feeding brush provided to another of the drive rotating member and the fixed member, and being in contact with the slip ring, wherein a rotational position of the motor output shaft is detected on an inner circumferential side beyond a contact portion between the slip ring and the power-feeding brush and beyond a contact portion between the commutator and the power switching brush.

The other objects and features of this invention will become understood from the following description with reference to the accompanying drawings.

BRIEF DESCRIPTION OF THE DRAWINGS

FIG. 8A is a view showing detection-pulse shapes of the first and second detectors. FIG. 8B is a view showing a composite-pulse shape of the first and second detectors under a maintaining control for a relative rotational phase. FIG. 8C is a view showing a composite-pulse shape of the first and second detectors under a changing control for the relative rotational phase.

FIG. 10B is a graph showing a state where a changed amount of the composite-pulse frequency relative to the crank-pulse frequency is converted into (a changed amount of) a VTC phase shift angle, on the basis of time.

DETAILED DESCRIPTION OF THE INVENTION

Figure 1:
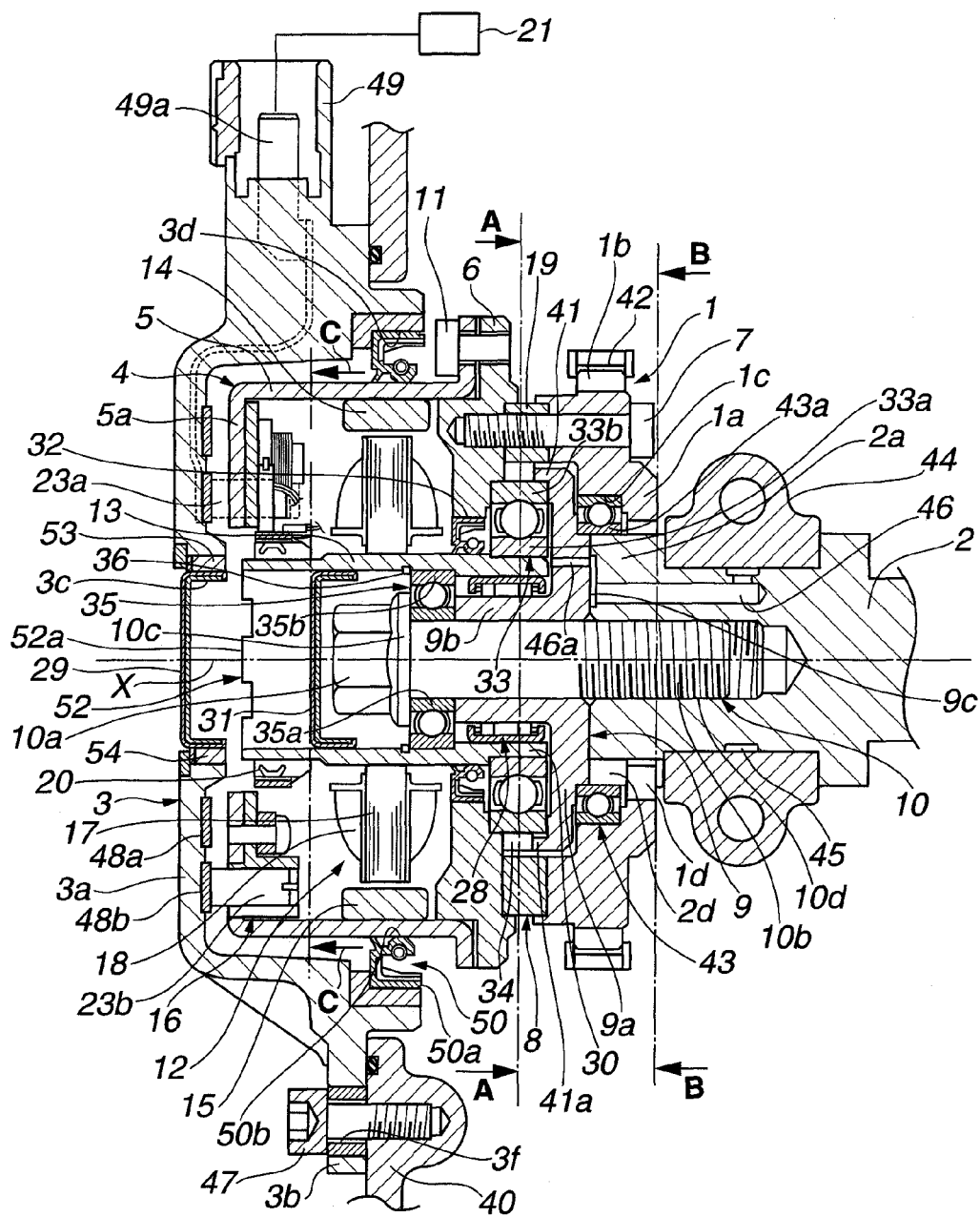
FIG. 1 is a longitudinal sectional view of a valve-timing control apparatus in an embodiment according to the present invention.

Hereinafter, embodiments of valve-timing control (VTC) apparatus for an internal combustion engine according to the present invention will be explained referring to the drawings. In the following embodiments, the valve-timing control apparatus is applied to a valve actuating device on an intake side of internal combustion engine. However, in the same manner, the valve-timing control apparatus according to the present invention can be applied to a valve actuating device on an exhaust side of the internal combustion engine.

As shown in FIGS. 1 to 5, the valve-timing control apparatus includes a timing sprocket 1, a cam shaft 2, a cover member 3 and a phase change mechanism 4. The timing sprocket 1 (drive rotating member) is rotated and driven by a crankshaft of the internal combustion engine. The cam shaft 2 is rotatably supported by a cylinder head (not shown) through a bearing 44, and is rotated by a rotational force transmitted from the timing sprocket 1. The cover member 3 is provided on a front side (in a front direction) of the timing sprocket 1, and is a fixed member which is fixedly attached to a chain cover 40 by bolts. The phase change mechanism 4 is provided between the timing sprocket 1 and the cam shaft 2, and is configured to change a relative rotational phase between the timing sprocket 1 and the cam shaft 2 in accordance with an operating state of the engine. The chain cover 40 is attached and fixed to the cylinder head by bolts.

Whole of the timing sprocket 1 is integrally formed of an iron-based metal. The timing sprocket 1 includes a sprocket main body 1a and a gear portion 1b.

The sprocket main body 1a is formed in an annular shape. An inner circumferential surface of the sprocket main body 1a is formed in a stepped shape to have two relatively large and small diameters as shown in FIG. 1. The gear portion 1b is provided integrally with an outer circumference of the sprocket main body 1a, and receives rotational force through a wound timing chain 42 from the crankshaft. Moreover, the timing sprocket 1 is rotatably supported by the cam shaft 2 through a second ball bearing 43 serving as a third bearing. The second ball bearing 43 is interposed between a circular groove is of the sprocket main body 1a and an outer circumference of a thick flange portion 2a of the cam shaft 2. The circular groove 1c is formed in an inner circumferential side of the sprocket main body 1a. The flange portion 2a is located at a front end portion of the cam shaft 2 and formed integrally with the cam shaft 2.

Figure 3:
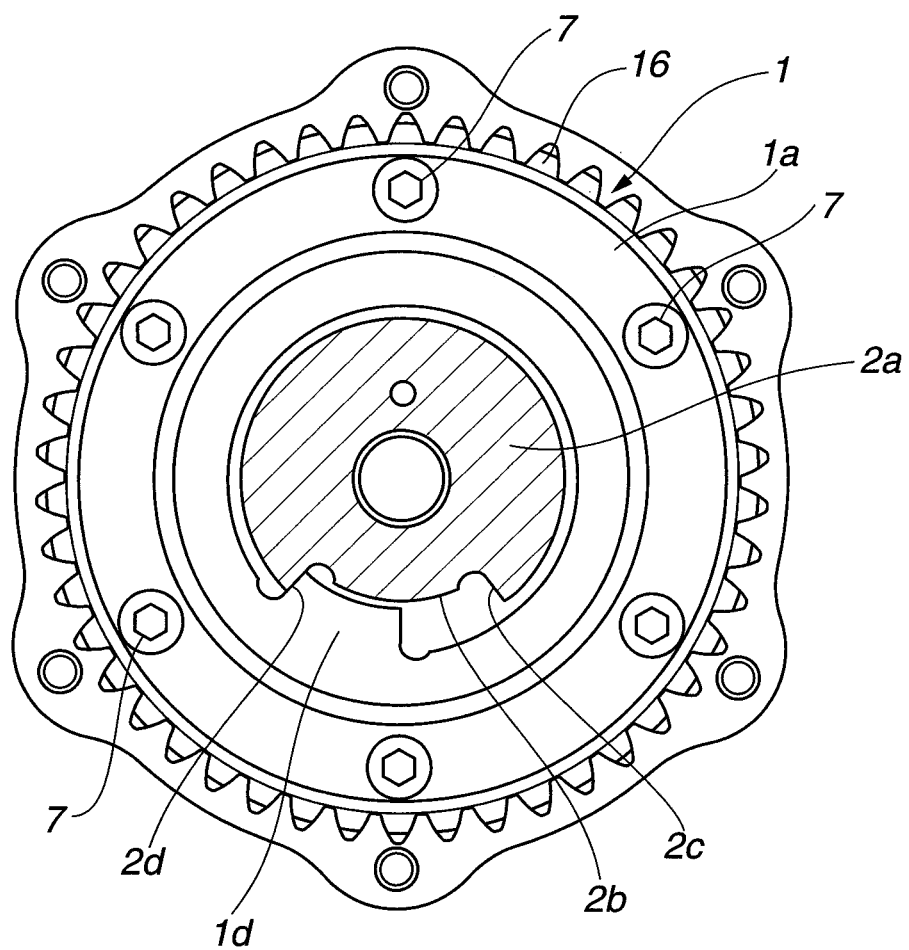
FIG. 3 is a sectional view of FIG. 1, taken along a line B-B.

At an outer circumferential edge of front end portion of the sprocket main body 1a, an annular (ring-shaped) protrusion 1b is formed integrally with the sprocket main body 1a. An annular member 19 and a plate 6 are fixed to the front end portion of the sprocket main body 1a by fastening both of the annular member 19 and plate 6 to the sprocket main body 1a by a bolt 7 in an axial direction of the cam shaft 2. The annular member 19 is positioned coaxially to the annular protrusion 1b on an inner circumferential side of the annular protrusion 1b. An inner circumference of the annular member 19 is formed with internal teeth (gear) 19a which function as a wave-shaped meshing portion. The plate 6 is formed in an annular shape, and has a large outer diameter. Moreover, as shown in FIG. 3, in a part of inner circumferential surface of the sprocket main body 1a, a stopper convex portion 1d is formed. The stopper convex portion 1d is formed in a circular-arc shape in cross section, and functions as an engaging portion. This stopper convex portion 1d is formed within a predetermined range given in a circumferential direction of the sprocket main body 1a.

A housing 5 is fixed to an outer circumference of front end side of the plate 6 by a bolt 11. The housing 5 is formed in a circular-tube shape, and constitutes a part of an after-mentioned electric motor 12 of the phase change mechanism 4.

The housing 5 is formed of an iron-based metal, and formed substantially in a U shape (cup shape) in cross section when taken by a plane parallel to the axial direction of cam shaft 2. The housing 5 functions as a yoke. The housing 5 includes a holding portion 5a formed integrally with the housing 5 at a front end side of the housing 5. The holding portion 5a is formed in an annular-plate shape. Whole of an outer circumferential side of the housing 5 including the holding portion 5a is covered by the cover member 3 to have a predetermined space (clearance) between the housing 5 and the cover member 3.

The cam shaft 2 includes two drive cams per one cylinder of the engine. Each drive cam is provided on an outer circumference of the cam shaft 3, and functions to open an intake valve (not shown). The front end portion of the cam shaft 2 is connected with a follower member 9 functioning as a driven rotating member, by a cam bolt 10 in the axial direction.

As shown in FIG. 3, the flange portion 2a of the cam shaft 2 is formed with a stopper concave groove 2b into which the stopper convex portion 1d of sprocket main body 1a is inserted and engaged. (A bottom surface of) The stopper concave groove 2b is formed in a circular-arc shape in cross section when taken by a plane perpendicular to the axial direction of cam shaft 2. The stopper concave groove 2b is formed in an outer circumferential surface of the flange portion 2a within a predetermined range given in a circumferential direction of the cam shaft 2. The cam shaft 2 rotates within this circumferential range relative to the sprocket main body 1a so that both end edges of the stopper convex portion 1d become respectively in contact with circumferentially-opposed edges 2c and 2d of the stopper concave groove 2b. Thereby, a relative rotational position of the cam shaft 2 to the timing sprocket 1 is restricted between a maximum advanced side and a maximum retarded side. The both of the stopper convex portion 1d and the stopper concave groove 2b constitutes a stopper mechanism.

The cam bolt 10 includes a head portion 10a and a shaft portion 10b. The head portion 10a is formed integrally with a seating surface portion 10c. The seating surface portion 10c is formed in a flange shape at an end edge of the head portion 10a which is located on the side of the shaft portion 10b. An outer circumference of the shaft portion 10b includes a male thread portion which is screwed into a female threaded portion of the cam shaft 2. The female threaded portion is formed from a tip edge of the cam shaft 2 toward an inside of the cam shaft 2 in the axial direction.

The follower member 9 is integrally formed of an iron-based metallic material. As shown in FIG. 1, the follower member 9 includes a circular plate portion 9a and a circular tube portion 9b. The circular plate portion 9a is formed in a rear end side of the follower member 9, and the circular tube portion 9b is formed in a front end side of the follower member 9. The circular tube portion 9b is formed in a tubular shape and is formed integrally with the circular plate portion 9a.

The circular plate portion 9a includes an annular step protrusion (a smaller diameter portion) 9c formed integrally with the circular plate portion 9a. The annular step protrusion 9c is located approximately at a radially center portion of a rear end surface of the circular plate portion 9a, i.e., has an outer diameter approximately equal to that of the flange portion 2a of the cam shaft 2. An outer circumferential surface of the step protrusion 9c and the outer circumferential surface of the flange portion 2a are inserted into an inner circumference of an inner race 43a of the second ball bearing 43, so that the outer circumferential surface of the step protrusion 9c and the outer circumferential surface of the flange portion 2a face each other to form a continuously flat surface. Thereby, at the time of assembling operation, a centering positioning of the cam shaft 2 and the follower member 9 is easy to carry out.

An outer race 43b of the second ball bearing 43 is fixed to an inner circumferential surface of the circular groove is of the sprocket main body is by press fitting.

Figure 2:
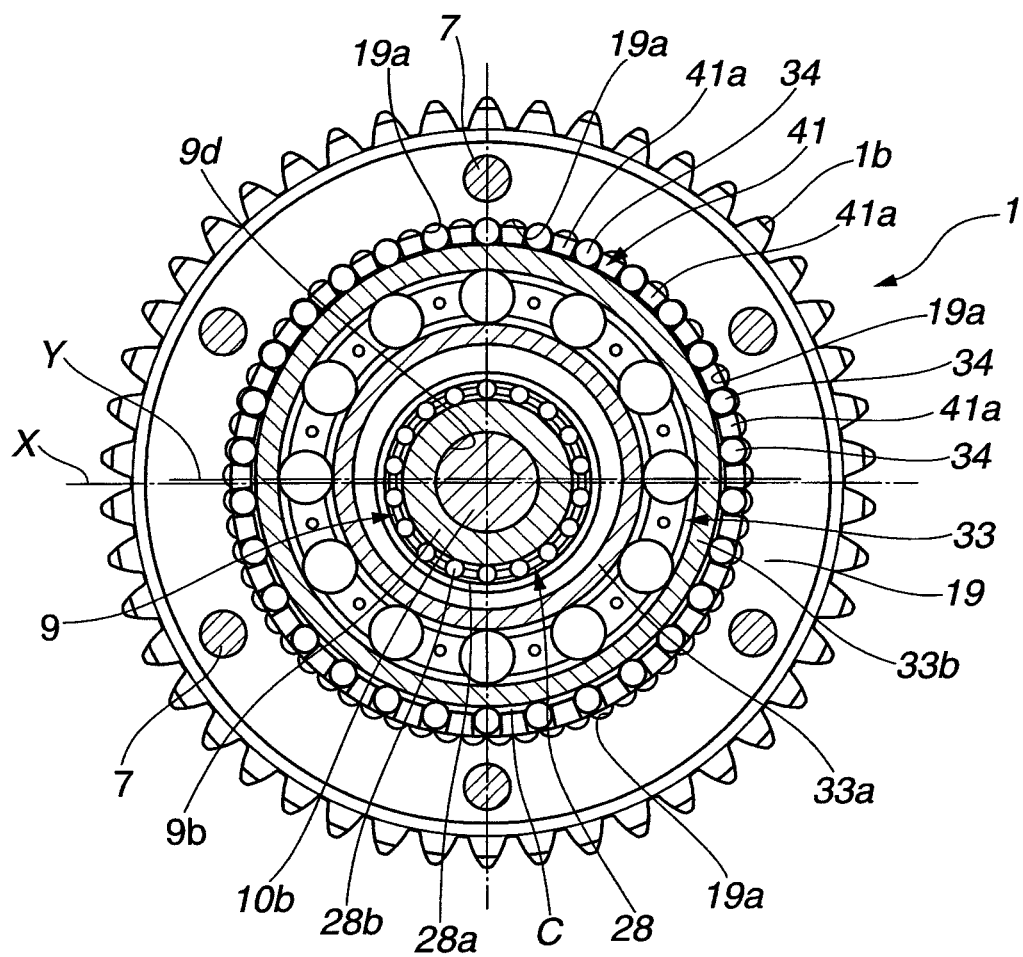
FIG. 2 is a sectional view of FIG. 1, taken along a line A-A.

As shown in FIGS. 1 and 2, an outer circumferential portion of the circular plate portion 9a is formed integrally with a retainer 41 retaining or holding an after-mentioned plurality of rollers 34. The retainer 41 is formed to protrude from the outer circumferential portion of the circular plate portion 9a in the direction same as an extending direction of the circular tube portion 9b. That is, the retainer 41 includes a plurality of narrow protruding portions 41a which are provided at approximately even intervals in the circumferential direction of the circular plate portion 9a to have a predetermined circumferential space (clearance) between each adjacent two protruding portions 41a.

As shown in FIG. 1, the circular tube portion 9b is formed with an insertion hole 9d passing through an center of the circular tube portion 9b in the axial direction. The shaft portion 10b of the cam bolt 10 is passed through the insertion hole 9d. Moreover, an after-mentioned needle bearing 28 is provided on an outer circumferential side of the circular tube portion 9b.

Figure 4:
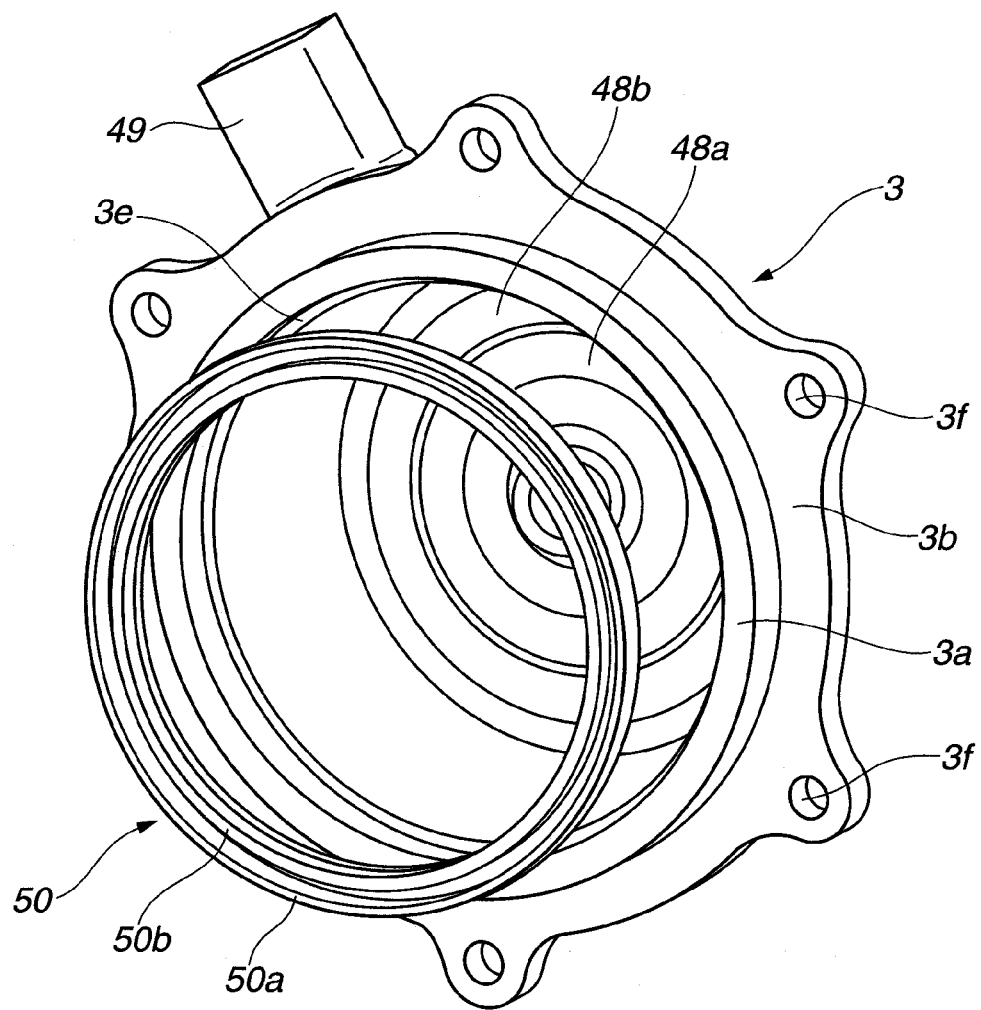
FIG. 4 is an exploded oblique perspective view of a cover member and a first oil seal in the embodiment.

As shown in FIGS. 1 and 4, the cover member 3 is formed to be relatively thick, and is integrally formed of a synthetic resin (nonmagnetic material). The cover member 3 includes a cover main body 3a and a bracket 3b. The cover main body 3a bulges out in a cup shape (protrudes in an expanded condition) frontward in the axial direction. The bracket 3b is formed integrally with the cover main body 3a on an outer circumference of rear end portion of the cover main body 3a.

The cover main body 3a is provided to cover a front end side of the phase change mechanism 4. That is, the cover main body 3a covers the substantially entire housing 5 ranging from the holding portion 5a of front end side of the housing 5 to a rear end portion side of the housing 5, so as to secure a predetermined space between the housing 5 and the cover main body 3a. A front end wall of the cover main body 3a is formed with a working hole 3c passing through an approximately center portion of the front end wall of the cover main body 3a. This working hole 3c is provided in order to allow the cam bolt 10 to pass through the working hole 3c when attaching respective structural components to the cam shaft 2 by the cam bolt 10. After this attaching work, a first plug 29 formed in a substantially U shape in cross section is fixed to the working hole 3c by being fitted in the working hole 3c so that an inside of the cover member 3 is enclosed. On the other hand, the bracket 3b formed in a substantially annular shape has six round boss portions, as shown in FIG. 4. Each of the six boss portions is formed with a bolt insertion hole 3f passing through the bracket 3b.

As shown in FIG. 1, the cover member 3 is fixed to the chain cover 40 by a plurality of bolts 47 inserted through the bolt insertion holes 3f of the bracket 3b. Double slip rings 48a and 48b are fixed integrally to an inside surface of the front end portion (front end wall) of the cover main body 3a in a buried state. That is, two slip rings 48a and 48b are located on radially-inner-and-outer circumferential lines (i.e., located at two spots radially shifted from each other in cross section) in the inside surface of the front end wall of the cover main body 3a, to expose an inside surface of each slip ring 48a, 48b to the inside of the cover member 3. At an upper end portion of the cover member 3, the cover member 3 includes a connector portion 49. A connector terminal 49a is fixed to an inner portion of the connector portion 49, and is connected with the slip rings 48a and 48b through so conductive members. A battery power source (not shown) supplies power to the connector terminal 49a and shuts off power from the connector terminal 49a, via a control unit 21.

As shown in FIGS. 1 and 4, a first oil seal 50 is interposed between an inner circumferential surface of rear end side of the cover main body 3a and an outer circumferential surface of the housing 5. The first oil seal 50 is a sealing member having a large diameter. The first oil seal 50 is formed substantially in a U shape in cross section, as shown in FIG. 1. The first oil seal 50 includes a base material of synthetic rubber, and a core metal buried in the base material. An annular base portion 50a of the first oil seal 50 which is located in an outer circumferential side of the first oil seal 50 is fixed to a circular groove 3d of the cover main body 3a to be fitted into the circular groove 3d. The circular groove 3d is formed in an inner circumferential surface of rear end portion of the cover main body 3a. Moreover, on an inner circumferential side of the annular base portion 50a, a seal surface 50b which is in contact with the outer circumferential surface of the housing 5 is formed integrally with the first oil seal 50.

The phase change mechanism 4 includes the electric motor 12 and a speed-reduction mechanism 8. The electric motor 12 is an actuator disposed on a front end side of the cam shaft 2, substantially coaxially to the cam shaft 2. The speed-reduction mechanism 8 functions to reduce a rotational speed of the electric motor 12 and to transmit the reduced rotational speed to the cam shaft 2.

As shown in FIG. 1, the electric motor 12 is a brush DC motor. The electric motor 12 includes the housing 5, a motor output shaft 13, a pair of permanent magnets 14 and 15, and a stator 16. The housing 5 is a yoke which rotates integrally with the timing sprocket 1. The motor output shaft 13 is arranged rotatably inside the housing 5. The pair of permanent magnets 14 and 15 are fixed to an inner circumferential surface of the housing 5. Each of the pair of permanent magnets 14 and 15 is formed in a half-round arc shape. The stator 16 is provided on an inner bottom surface side of the holding portion 5a of housing 5.

The motor output shaft 13 is formed in a tubular shape, and functions as an armature. An iron-core rotor 17 having a plurality of poles is fixed to an outer circumference of a substantially axially center portion of the motor output shaft 13. Electromagnetic coils 18 are wound on an outer circumference of the iron-core rotor 17. Moreover, a commutator 20 is fixed to an outer circumference of front end portion of the motor output shaft 13 by press fitting. The commutator 20 is divided into the same number of segments as the number of poles of the iron-core rotor 17. The electromagnetic coils 18 are connected through harnesses with the respective segments of the commutator 20. Moreover, a second plug 31 is fixed to the motor output shaft 13 to be fitted into the motor output shaft 13 by press fitting. As shown in FIG. 1, the second plug 31 is formed substantially in a U shape in cross section, and encloses the inside of motor output shaft 13 after the cam bolt 10 has been fastened.

Figure 5:
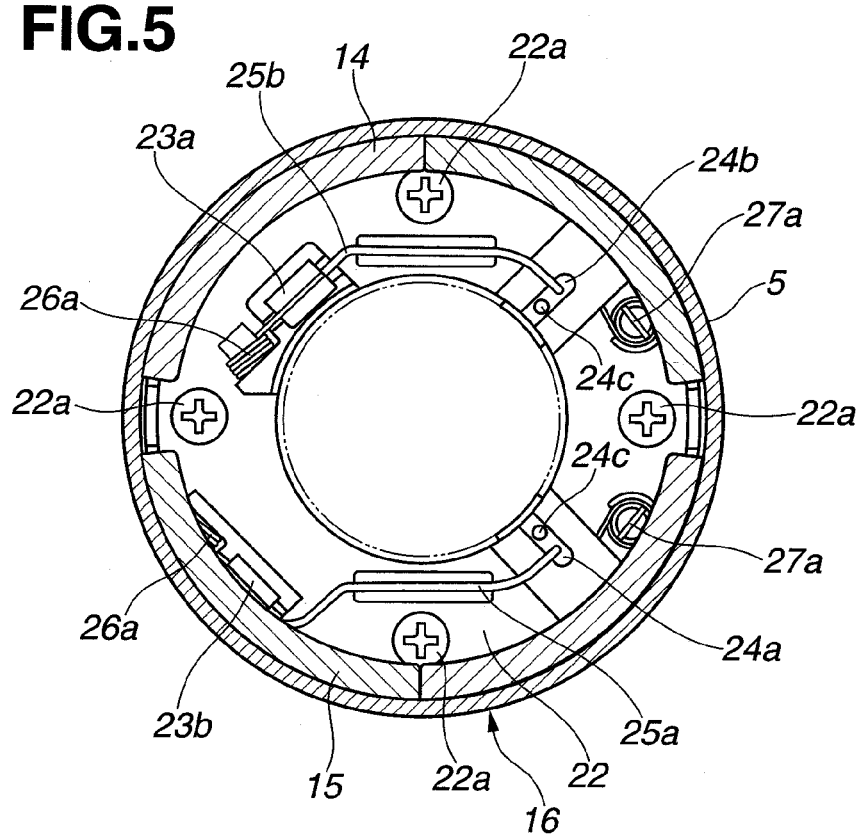
FIG. 5 is a sectional view of FIG. 1, taken along a line C-C.

As shown in FIG. 5, the stator 16 mainly includes a resin holder 22, radially inner and outer first brushes 23a and 23b each functioning as a power-feeding brush, and second brushes 24a and 24b each functioning as a power switching brush. The resin holder 22 is formed in a circular plate shape, and is fixed to an inner bottom wall of the holding portion 5a by four screws 22a. Each first brush 23a, 23b is disposed to pass through the resin holder 22 and the holding portion 5a in the axial direction. Respective tip surfaces of the two first brushes 23a and 23b are slidably in contact with the pair of slip rings 48a and 48b to receive electric power. Each second brush 24a, 24b is held in an inner circumferential side of the resin holder 22, and is movable in radially inner and outer directions of the resin holder 22. An arc-shaped tip portion of each second brush 24a, 24b is slidably in contact with an outer circumferential surface of the commutator 20.

The first brush 23a is connected with the second brush 24b through a pigtail harness 25b. On the other hand, the first brush 23b is connected with the second brush 24a through a pigtail harness 25a. A torsion spring 26a is provided to abut on each first brush 23a, 23b with its biasing force, and a torsion spring 27a is provided to abut on each second brush 24a, 24b with its biasing force. The first brushes 23a and 23b are biased (urged) respectively toward the slip rings 48a and 48b by the biasing forces of the torsion springs 26a. The second brushes 24a and 24b are biased (urged) respectively toward the commutator 20 by the biasing forces of the torsion springs 27a.

As shown in FIG. 1, the motor output shaft 13 is supported rotatably by the needle bearing 28 and a third ball bearing 35. The needle bearing 28 is provided on an outer circumferential side of the circular tube portion 9b of the follower member 9.

The third ball bearing 35 is provided on an outer circumferential side of the shaft portion 10b of the cam bolt 10 which is located adjacent or close to the seating surface portion 10c. Moreover, an eccentric shaft portion 30 is formed integrally with a rear end portion of the motor output shaft 13 which is close to the cam shaft 2. The eccentric shaft portion 30 is formed in a circular tube shape, and constitutes a part of the speed-reduction mechanism 8.

As shown in FIG. 2, the needle bearing 28 includes a retainer 28a and a plurality of needle rollers 28b. The retainer 28a is formed in a circular tubular shape, and is fitted in an inner circumferential surface of the eccentric shaft portion 30 by press fitting. Each needle roller 28b is a rolling element supported rotatably inside the retainer 28a. The needle rollers 28b roll on an outer circumferential surface of the circular tube portion 9b of the follower member 9.

An inner race 35a of the third ball bearing 35 is fixed between a front end edge of the circular tube portion 9b of the follower member 9 and the seating surface portion 10c of the cam bolt 10 in a sandwiched state. On the other hand, an outer race 35b of the third ball bearing 35 is positioned and held by being sandwiched between a snap ring 36 functioning as a retaining ring and a step portion formed in the inner circumference of the motor output shaft 13, in the axial direction.

A second oil seal 32 is provided between the outer circumferential surface of the motor output shaft 13 (eccentric shaft portion 30) and an inner circumferential surface of the plate 6. The second oil seal 32 prevents lubricating oil from leaking from an inside of the speed-reduction mechanism 8 into the electric motor 12. In addition to this sealing function, the second oil seal 32 also applies frictional resistance to the rotation of the motor output shaft 13, by causing an inner circumferential portion of the second oil seal 32 to elastically abut on the outer circumferential surface of the motor output shaft 13.

The control unit 21 detects a current operating state of the engine on the basis of information signals derived from various kinds of sensors and the like, such as a crank angle sensor (not shown) for sensing a rotational position of the crankshaft, an air flow meter for sensing an intake air quantity, a water temperature sensor and an accelerator opening sensor. Thereby, the control unit 21 controls an ignition timing, a fuel injection quantity and the like.

Moreover, the control unit 21 detects a relative rotational-angle phase between the cam shaft 2 and the crankshaft on the basis of detection signals derived from the crank angle sensor and a cam angle sensor (not shown) for sensing a rotational position of the cam shaft 2, when the engine is in a normal operating state which is higher than a predetermined low-rotational-speed region (low revolutions). Then, on the basis of these detection signals, the control unit 21 performs a forward/reverse rotation control of the motor output shaft 13 by supplying electric power to the electromagnetic coils 18 of the electric motor 12. Thereby, the control unit 21 controls a relative rotational phase of the cam shaft 2 to the timing sprocket 1, through the speed-reduction mechanism 8.

Moreover, as shown in FIG. 1, the control unit 21 performs another relative rotational phase control of the cam shaft 2 relative to the timing sprocket 1, through the electric motor 12 with a higher accuracy. This control is performed by receiving a rotational angle signal of the motor output shaft 13 by means of a rotation sensing mechanism 51 for sensing a rotational position of the motor output shaft 13, in a range from a stopped state of the engine or a starting state of the engine to the low-rotational-speed region of the engine. A concrete structure and a sensing method of the rotation sensing mechanism 51 will be explained later.

As shown in FIGS. 1 and 2, the speed-reduction mechanism 8 includes mainly includes the eccentric shaft portion 30, a first ball bearing 33, the rollers 34, the retainer 41, and the follower member 9 formed integrally with the retainer 41. The eccentric shaft portion 30 conducts an eccentric rotational motion. The first ball bearing 33 is provided on an outer circumference of the eccentric shaft portion 30. The rollers 34 are provided on an outer circumference of the first ball bearing 33. The retainer 41 retains (guides) the rollers 34 along a rolling direction of the rollers 34, and permits a radial movement of each roller 34.

As shown in FIG. 2, an outer circumferential surface of the eccentric shaft portion 30, i.e., a cam surface of the eccentric shaft portion 30 has a center (axis) Y which is eccentric (deviated) slightly from a shaft center X of the motor output shaft 13 in the radial direction. The first ball bearing 33, the rollers 34 and the like constitute a planetary meshing portion.

The first ball bearing 33 has a relatively large diameter. Thereby, substantially whole of the first ball bearing 33 overlaps with the needle bearing 28 in the radial direction, i.e., the first ball bearing 33 is located approximately within an axial existence range of the needle bearing 28. An inner race 33a of the first ball bearing 33 is fixed to the outer circumferential surface of the eccentric shaft portion 30 by press fitting. An outer circumferential surface of an outer race 33b of the first ball bearing 33 is always in contact with the respective rollers 34. Moreover, as shown in FIG. 2, an annular clearance C is formed on an outer circumferential side of the outer race 33b. Whole of the first ball bearing 33 can move in the radial direction through this clearance C, with the eccentric rotation of the eccentric shaft portion 30. That is, whole of the first ball bearing 33 can conduct an eccentric movement by way of the annular clearance C.

With the eccentric movement of the first ball bearing 33, the respective rollers 34 move in the radial direction and are fitted in the internal teeth 19a of the annular member 19. Also, with the eccentric movement of the first ball bearing 33, the rollers 34 are forced to do a swinging motion in the radial direction while being guided in the circumferential direction by the protruding portions 41a of the retainer 41. That is, the rollers 34 are moved closer to the internal teeth 19a and are moved away from the internal teeth 19a, repeatedly, by the eccentric movement of the first ball bearing 33.

Lubricating oil is supplied into the speed-reduction mechanism 8 by a lubricating-oil supplying means (supplying section). As shown in FIG. 1, this lubricating-oil supplying means includes an oil supply passage 45, an oil supply hole 46, an oil supply hole 46a having a small hole diameter, and three oil discharge holes (not shown) each having a large hole diameter. The oil supply passage 45 is formed in an outer circumference of a journal of the cam shaft 2 which is supported by the bearing 44 of the cylinder head. Lubricating oil is supplied from a main oil gallery (not shown) to the oil supply passage 45. The oil supply hole 46 is formed inside the cam shaft 2 to extend in the axial direction. The oil supply hole 46 communicates with the oil supply passage 45. The oil supply hole 46a is formed inside the follower member 9 to pass through the follower member 9 in the axial direction. One end of the oil supply hole 46a is open to the oil supply hole 46, and another end of the oil supply hole 46a is open to a region near the needle bearing 28 and the first ball bearing 33. The three oil discharge holes are formed inside the follower member 9 to pass through the follower member 9 in the same manner.

Next, basic operations in this embodiment according to the present invention will now be explained. At first, when the crankshaft of the engine is drivingly rotated, the timing sprocket 1 is rotated through the timing chain 42. This rotative force is transmitted through the annular member 19 and the plate 6 to the housing 5 of electric motor 12. Thereby, the permanent magnets 14 and 15 and the stator 16 rotate in synchronization with the annular member 19. On the other hand, the rotative force of the annular member 19 is transmitted through the rollers 34, the retainer 41 and the follower member 9 to the cam shaft 2. Thereby, the cam shaft 2 rotates at a half rotational speed of the crankshaft while causing the cam provided on the outer circumferential side of cam shaft 2 to open the intake valve against biasing force of a valve spring of the intake valve.

Under the normal operating state after the start of engine, the battery power source supplies electric power through the slip rings 48a and 48b and the like to the electromagnetic coils 18 of electric motor 12 by the control signal of the control unit 21. Thereby, the rotation of the motor output shaft 13 is controlled in the forward or reverse rotational direction (relative to the housing 5). This rotative force of the motor output shaft 13 is transmitted through the speed-reduction mechanism 8 to the cam shaft 2, so that the relative rotational phase of the cam shaft 2 to the timing sprocket 1 is controlled.

That is, (the outer circumferential surface of) the eccentric shaft portion 30 eccentrically rotates in accordance with the rotation of the motor output shaft 13. Thereby, each roller 34 rides over (is disengaged from) one internal tooth 19a of the annular member 19 and thereby moves to the other adjacent internal tooth 19a with its rolling motion while being radially guided by the protruding portions 41a of the retainer 41, every one rotation of the motor output shaft 13. By repeating this motion sequentially, each roller 34 rolls in the circumferential direction under a contact state. By this contact rolling motion of each roller 34, the rotating force of the motor output shaft 13 is transmitted to the follower member 9 while the rotational speed of the motor output shaft 13 is reduced. A speed reduction rate which is obtained at this time can be set at any value by adjusting the number of rollers 34 and the like.

Accordingly, the cam shaft 2 rotates in the forward or reverse direction relative to the timing sprocket 1 so that the relative rotational phase between the cam shaft 2 and the timing sprocket 1 is changed. Thereby, opening and closing timings of the intake valve are controllably changed to its advance or retard side.

As shown in FIG. 3, a maximum positional restriction (angular position limitation) for the forward/reverse relative rotation of cam shaft 2 to the timing sprocket 1 is performed when one of respective lateral surfaces (circumferentially-opposed surfaces) of the stopper convex portion 1d becomes in contact with the corresponding one of the circumferentially-opposed surfaces 2c and 2d of the stopper concave groove 2b.

That is, when the follower member 9 rotates (at a higher speed) in the same rotational direction as that of the timing sprocket 1 with the eccentric rotational motion of the eccentric shaft portion 30, one lateral surface of the stopper convex portion 1d becomes in contact with the surface 2c of the stopper concave groove 2b so that a further relative rotation of the follower member 9 in the same direction is prohibited. Thereby, the relative rotational phase of the cam shaft 2 to the timing sprocket 1 is changed to the advance side at maximum.

On the other hand, when the follower member 9 rotates in a relatively opposite rotational direction to that of (i.e., at a lower speed than) the timing sprocket 1 with the eccentric rotational motion of the eccentric shaft portion 30, another lateral surface of the stopper convex portion 1d becomes in contact with the surface 2d of the stopper concave groove 2b so that a further rotation of the follower member 9 in the relatively-opposite direction is prohibited. Thereby, the relative rotational phase of the cam shaft 2 to the timing sprocket 1 is changed to the retard side at maximum.

As a result, the opening and closing timings of the intake valve can be changed to the advance side or the retard side up to its maximum. Therefore, a fuel economy and an output performance of the engine are improved.

Thus, in this embodiment, the stopper mechanism constituted by the stopper convex portion 1d and the stopper concave groove 2b can reliably restrict the relative rotational position of the cam shaft 2.

Figure 6:
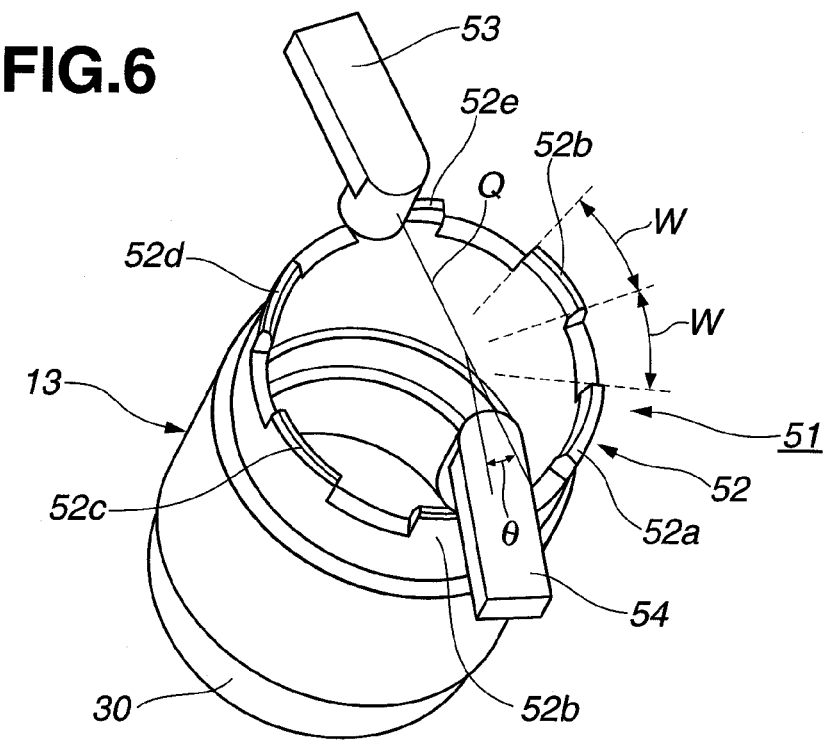
FIG. 6 is an oblique perspective view of a motor output shaft and respective detectors of a rotation sensing mechanism in the embodiment.

The rotation sensing mechanism 51 is a rotation sensor of electromagnetic induction type. As shown in FIGS. 1 and 6, the rotation sensing mechanism 51 includes a magnetic rotor 52 and two first and second detectors 53 and 54. The magnetic rotor 52 is provided integrally with an inner circumference of front end of the motor output shaft 13, and functions as an object to be detected (a detection-target section). The first and second detectors 53 and 54 are provided in the cover main body 3a in a buried state, on an outer circumferential side of the first plug 29. The first and second detectors 53 and 54 function as a detecting section.

Therefore, the rotation sensing mechanism 51 is disposed at a radially-inner location beyond the slide contact portion between the first brushes 23a and 23b and the pair of slip rings 48a and 48b and also beyond the slide contact portion between the commutator 20 and the second brushes 24a and 24b. That is, the rotation sensing mechanism 51 is located on an inner circumferential side of these slide contact spots.

The magnetic rotor 52 includes six targets 52a to 52f each functioning as a pulse generating tooth. Each target 52a to 52f is provided to protrude from the front end of the motor output shaft 13 in the axial direction of the motor output shaft 13. The six targets 52a to 52f are formed in the front end of the motor output shaft 13 substantially at circumferentially even intervals.

On the other hand, each of the first and second detectors 53 and 54 includes a yoke and a detection coil for sensing magnetic flux density, therein. The detection coil senses magnetic flux density when each target 52a to 52f passes through the detector 53 or 54 with the rotation of the magnetic rotor 52. Hence, the first and second detectors 53 and 54 output pulse signals as shown in FIG. 7.

The targets 52a to 52f are provided at even intervals in the circumferential direction such that a Hi-Lo width W of a pulse signal P1 generated by the first detector 53 is equal to a Hi-Lo width W of a pulse signal P2 generated by the second detector 54. That is, the pulse widths of pulse signals P1 and P2 are equal to each other at the time of constant rotational speed of the magnetic rotor 52.

As shown in FIG. 6, the second detector 54 is located at a position deviated by a predetermined angle θ from an imaginary line Q which is perpendicular to the axis of the motor output shaft 13 and which connects a sensing point of the first detector 53 with the axis. That is, an imaginary line which is perpendicular to the axis of the motor output shaft 13 and which connects a sensing point of the sensing detector 54 with the axis makes the predetermined angle θ with the imaginary line Q. By means of this arrangement of the detectors 53 and 54, the Hi signal of the second pulse signal P2 of the second detector 54 overlaps with the Hi signal of the first pulse signal P1 of the first detector 53 so that a quarter of a detection period of the first pulse signal P1 can be detected, as shown in FIG. 7.

Figure 7:
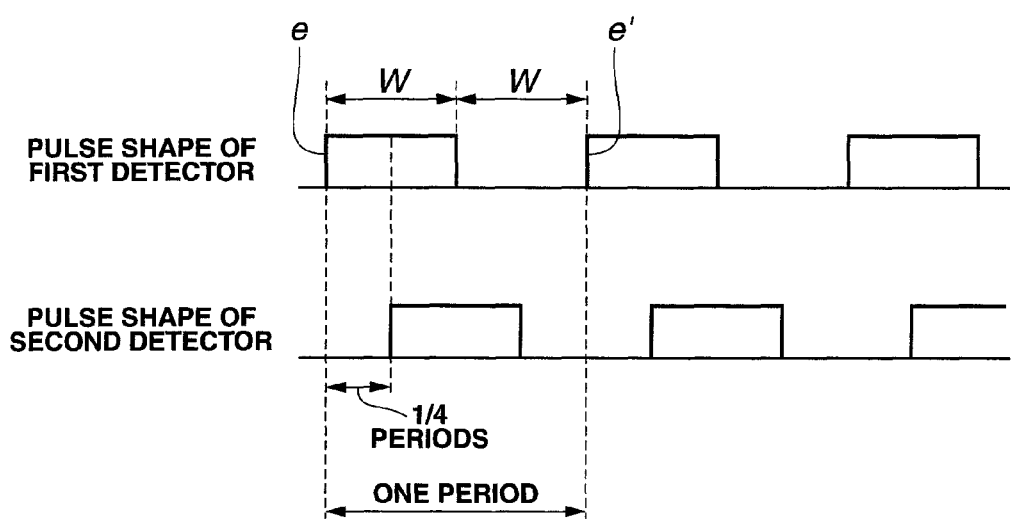
FIG. 7 is a view showing detection-pulse shapes of first and second detectors.

That is, as shown in FIG. 7, if one detection period in the first pulse signal P1 of the first detector 53 is defined by a time length between a rising edge e of an initial Hi signal and a rising edge e' of a next Hi signal, the second pulse signal P2 is shifted from the first pulse signal P1 by one fourth of the one detection period. That is, the predetermined angle θ is set to ensure this relation between the first and second pulse signals P1 and P2.

Figure 8:
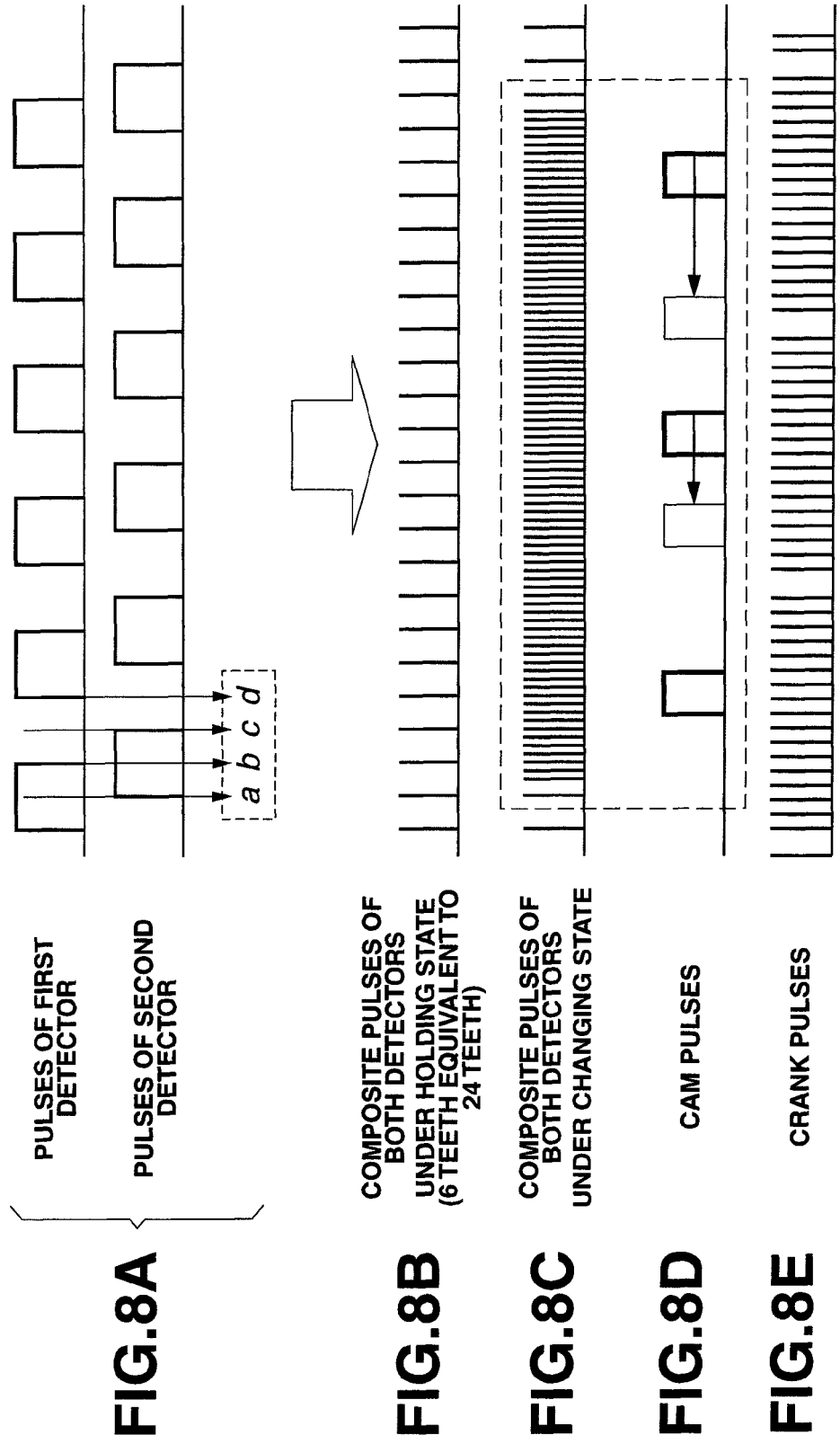
FIGS. 8A to 8C are views showing a relation of respective pulse signals.
FIG. 8D is a view showing a cam pulse shape.
FIG. 8E is a view showing a crank pulse shape.

As shown in FIG. 8A, the control unit 21 judges whether the electric motor 12 is rotating in the forward direction or the reverse direction by discriminating (checking) a region of edges a, b, c and d based on the first and second pulse signals (combination of Hi and Lo edges) of the first and second detectors 53 and 54. For example, if a signal of b→c is detected, the control unit 21 determines that the motor output shaft 13 is rotating in the forward direction. If a signal of b→a is detected, the control unit 21 determines that the motor output shaft 13 is rotating in the reverse direction.

As shown in FIG. 8B, by outputting pulses at the time of edges a, b, c, d, . . . , i.e., at switching timings, a composite pulse signal constituted by twenty four pulses (per one rotation) can be obtained from the six targets 52a to 52f. Therefore, a resolution of rotational angle of the motor output shaft 13 is increased. The pulse-signal output shown by FIG. 8B represents a state where the relative rotational phase angle between the timing sprocket 1 and the cam shaft 2 is being maintained at a constant angle. A pulse-signal output shown by FIG. 8C represents a state where the relative rotational phase angle of the cam shaft to the timing sprocket 1 is being changed (during a changing process). As recognized by comparing FIG. 8B with FIG. 8C, a high frequent pulse detection can be obtained during the change of the relative rotational phase, as compared with the maintaining state of the relative rotational phase.

FIG. 8D shows reference pulses of cam angle (cam pulses) outputted from the cam sensor. FIG. 8E shows reference pulses of crank angle (crank pulses) outputted from the crank angle sensor. The relative rotational phase between the timing sprocket 1 and the cam shaft 2 is detected based on a correlation between the crank pulses and the composite pulses derived from the two detectors 53 and 54.

A concrete calculation method for the relative rotational phase between the timing sprocket 1 and the cam shaft 2 will now be explained referring to FIGS. 9 and 10 in the case where the relative rotational phase angle between the timing sprocket 1 and the cam shaft 2 is held at a constant level and in the case where the relative rotational phase angle is being changed.

At first, in the case where the relative rotational phase angle between the timing sprocket 1 and the cam shaft 2 is being maintained at a constant level, a frequency of the composite pulse is compared with a frequency of the crank pulse outputted from the crank pulse sensor every time the composite pulses derived from both the detectors 53 and 54 are detected, as shown in FIG. 9A. A correlation value between the frequency of the composite pulse of both the detectors 53 and 54 and the frequency of the crank pulse is checked (compared) referring to a reference correlation value between the frequency of the composite pulse and the frequency of the crank pulse which is shown by FIG. 9B. If these two frequency correlation values conform to each other, the control unit 21 can determine that the relative rotational phase angle is being maintained at a certain angle.

Figure 9:
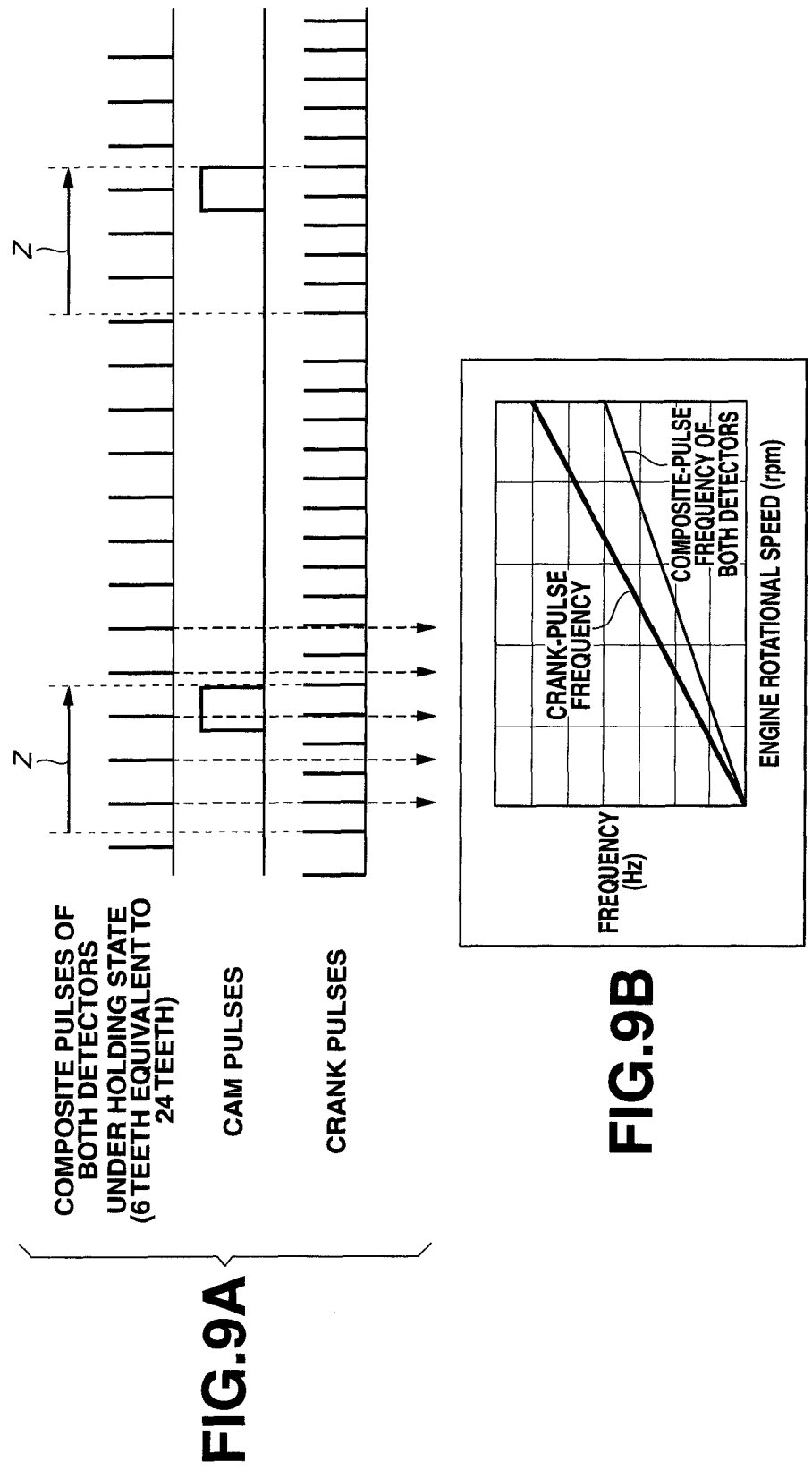
FIG. 9A is a view showing a relation among the composite-pulse shape of the first and second detectors, the cam pulse shape and the crank pulse shape under the maintaining control for the relative rotational phase.
FIG. 9B is a graph showing a correlative relation between a composite-pulse frequency and a crank-pulse frequency on the basis of a rotational speed of engine.
Figure 10:
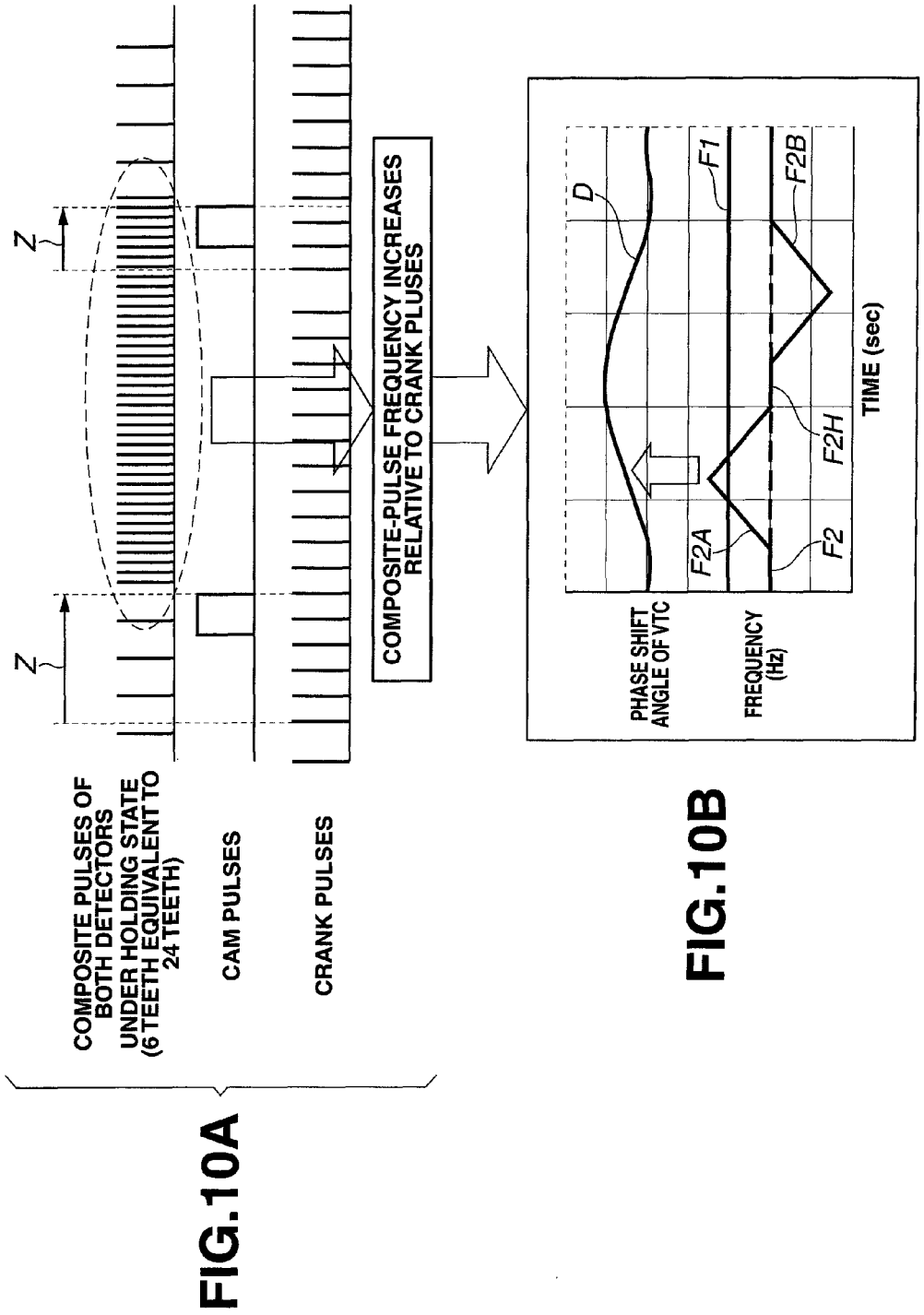
FIG. 10 is a view showing a relation among the composite-pulse shape of the first and second detectors, the cam pulse shape and the crank pulse shape under the changing control for the relative rotational phase.

Each arrow Z shown in FIGS. 9 and 10 represents a detection timing (time range) for the crank pulses and the cam pulses. In the normal middle-rotational-speed region and high-rotational-speed region of the engine, the crank pulses and the cam pulse are picked up at the detection timing (over the time range) so as to detect the relative rotational angle (phase shift angle) between the timing sprocket 1 and the cam shaft 2.

Next, in the case where the relative rotational phase between the timing sprocket 1 and the cam shaft 2 is being changed, the composite pulse signal derived from both the detectors 53 and 54 have a fine and high frequent shape as compared with the case of the maintaining control of the relative rotational phase while the crank pulses are outputted at a certain frequency without change, as shown in FIG. 10A. This is because the rotational speed of the motor output shaft 13 becomes large when the relative rotational phase is being changed (in process of change).

Then, as shown in FIG. 10B, an amount by which the frequency F2 of the composite pulse has changed relative to the frequency F1 of the crank pulse is converted into the relative rotational phase angle, so that a phase shift angle D can be detected. That is, for example, if the composite-pulse frequency F2 becomes higher relative to the crank-pulse frequency F1 (see, an upwardly-tapered triangle F2A), it can be determined that the phase shift angle D has changed to the advance side. Then, if the composite-pulse frequency F2 is maintained at a constant level relative to the crank-pulse frequency F1 from this advanced state (see, a parallel line F2H), it can be determined that the advanced state is being maintained. Then, if the composite-pulse frequency F2 becomes lower relative to the crank-pulse frequency F1 from this maintaining state (see, a downwardly-tapered triangle F2B), it can be determined that the phase shift angle D has changed to the retard side. That is, the phase shift angle D is detected by converting the changed amount of the composite-pulse frequency F2 relative to the crank-pulse frequency F1 into (a changed amount of) the phase shift angle D.

Figure 11:
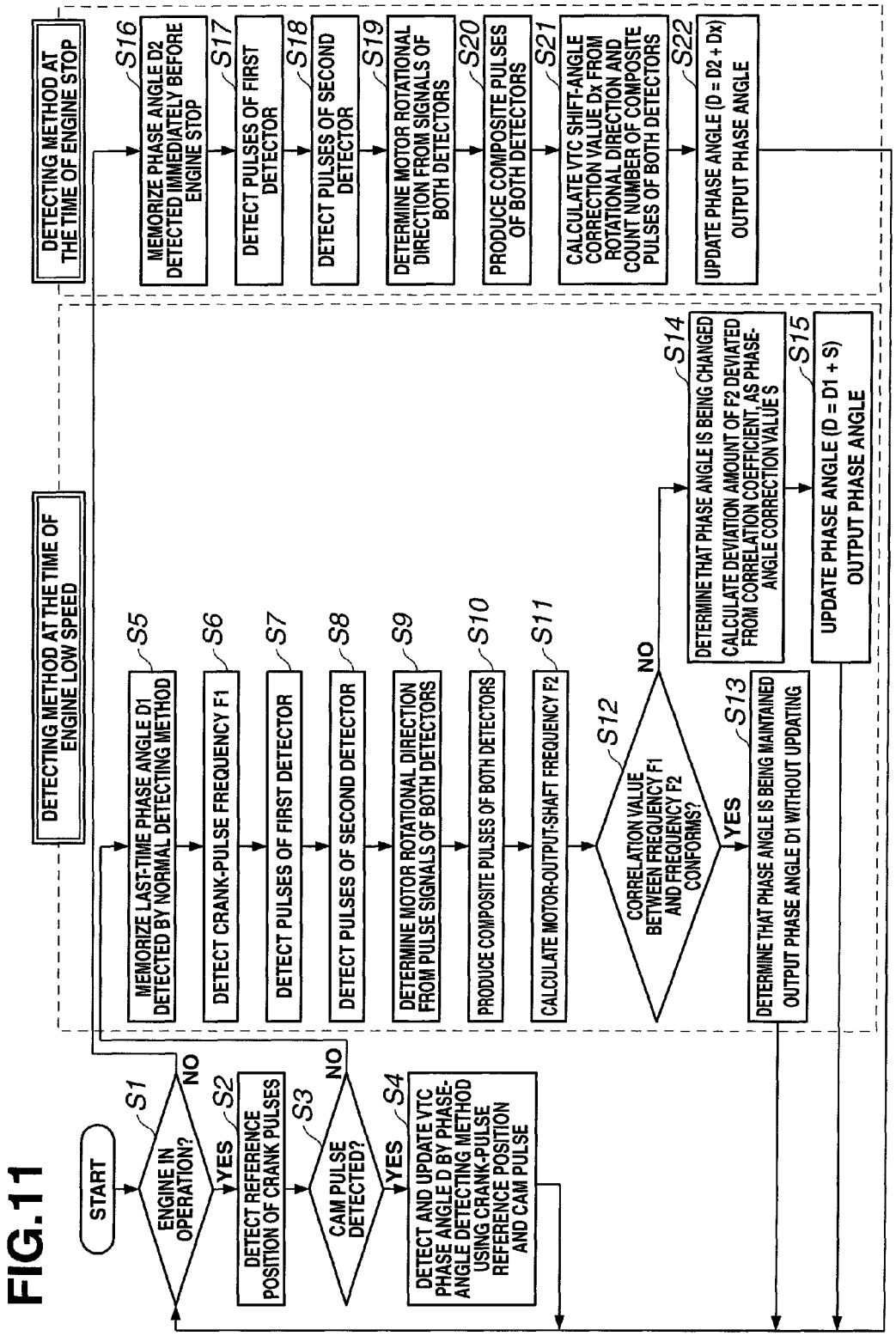
FIG. 11 is a flowchart in a control unit in which the phase shift angle is detected on the basis of respective detection signals derived from a crank angle sensor, a cam angle sensor and the first and second detectors.

FIG. 11 is a flowchart showing the detecting method of the phase shift angle D in the control unit 21 when the engine is in operation and when the engine is in stopped state.

[Detecting Method at the Time of Low Speed of Engine]

At step S1, the control unit 21 (controller) judges whether or not the engine is in operation after a cranking (start) of the engine. If the controller determines that the engine is in operation, i.e., if YES at step S1; the program proceeds to step S2. At step S2, the controller detects a reference position of the crank pulses from the crank angle sensor.

At step S3, the controller judges whether or not the cam pulse has been detected by the cam angle sensor. If the controller determines that the cam pulse has been detected, i.e., if YES at step S3, the program proceeds to step S4. At step S4, the controller calculates the phase shift angle D by a general detecting method (calculating method) using the crank pulses and the cam pulses. Then, the controller updates the phase shift angle D by the calculated new value. Then, the program is returned. The above processing of steps S1 to S4 is executed in the range from the middle-rotational-speed region to the high-rotational-speed region of the engine.

If the controller determines that the cam pulse has not been detected at step S3, i.e., if NO at step S3; the controller determines that a current operating state of the engine is the cranking state or in the predetermined low-rotational-speed region. Then, the program proceeds to step S5. At step S5, the controller memorizes a value D1 of the phase shift angle D which has been previously calculated or detected by the general detecting method immediately before this detecting routine (steps S5 to S15) is started.

At step S6, the controller calculates the crank-pulse frequency F1 as shown in FIG. 106 from the crank pulse signal. At step S7, the controller detects the pulse signal outputted from the first detector 53. At step S8, the controller detects the pulse signal outputted from the second detector 54.

At step S9, as shown in FIG. 8A, the controller judges the rotational direction of the electric motor 12 from the pulse signals of both the first and second detectors 53 and 54.

Next, at step S10, the controller produces the composite pulse signal from the both pulse signals of the first and second detectors 53 and 54. Then, the program proceeds to step S11. At step S11, the controller calculates the composite-pulse frequency F2 as shown in FIG. 10B (pulse frequency of the motor output shaft 13). Then, the program proceeds to step S12.

At step S12, the controller judges whether or not the correlation value between the crank-pulse frequency F1 and the composite-pulse frequency F2 conforms to its reference value as shown in FIG. 9B. This "conformity (conform)" is not necessarily a complete conformity (perfect matching). That is, the controller recognizes that the correlation value between the crank-pulse frequency F1 and the composite-pulse frequency F2 conforms if the correlation value substantially conforms to the reference value (is approximately equal to the reference value).

If the controller determines that the correlation value conforms to the reference value, i.e., if YES at step S12; the program proceeds to step S13. At step S13, the controller determines that the phase shift angle D is being maintained at a certain angle. Hence, the controller does not update the phase shift angle D, and the program returns to step S1.

If the controller determines that the correlation value between the crank-pulse frequency F1 and the composite-pulse frequency F2 does not conform to the reference value, i.e., if NO at step S12; the program proceeds to step S14. At step S14, the controller determines that the phase shift angle D is being changed. Hence, the controller calculates the changed amount of the composite-pulse frequency F2 deviated from a correlation coefficient between the crank-pulse frequency F1 and the composite-pulse frequency F2, and converts the calculated amount into a phase value as a phase-angle correction value (complementary value) S.

Next, at step S15, the controller adds the phase-angle correction value S to the initial value D1 of the phase shift angle D which was memorized at step S5, so that a current value of the phase shift angle D is calculated. Then, the controller updates the phase shift angle D by the calculated current value, and outputs the updated phase shift angle D.

In this embodiment, the phase shift angle is calculated by using the composite pulse signal at the time of cranking and at the time of low-speed region of engine. However, this calculation method for the phase shift angle can be used also at the time of normal middle-speed region of engine and at the time of normal high-speed region of engine.

[Detecting Method at the Time of Stop of Engine]

A processing after step S16 shows a detecting method that is performed when the engine is stopped. Specifically, in the case that the controller determines that the engine is in the stopped state at step S1, the program proceeds to step S16.

At step S16, the controller stores a value D2 of the phase shift angle D detected immediately before the stop of the engine, in a memory. That is, the phase-shift-angle value D2 is a value obtained from the respective information signals of the cam angle sensor and the crank angle sensor of the crankshaft conducting a coasting rotation after the ignition switch was turned off. Then, the program proceeds to step S17.

At step S17, the controller detects the pulse signal outputted from the first detector 53. Then, at step S18, the controller detects the pulse signal outputted from the second detector 54. Then, the program proceeds to step S19.

At step S19, as explained by FIG. 8A, the controller judges the rotational direction of the motor output shaft 13 from the both pulse signals of the first and second detectors 53 and 54. Then, the program proceeds to step S20.

At step S20, the controller produces the composite pulse signal from the both pulse signals of the first and second detectors 53 and 54.

At step S21, the controller calculates the changed amount (correction value) Dx of the phase shift angle and its changing direction (i.e., advance side or retard side), from the count number (frequency) of the composite pulses of the both detectors 53 and 54 and the detected rotational direction of the motor output shaft 13.

The phase shift angle is usually set according to an engine temperature to secure a favorable restarting performance. In this embodiment, the set phase shift angle corresponds to a case where the engine temperature at the time of restart is higher than a predetermined temperature. In this case, the phase shift angle is set at a position deviated to the retard side by a predetermined angle from a center position between the maxim advance side and the maximum retard side.

This phase shift angle D can be set at any value. For example, the phase shift angle D may be set at the maximum retard position in order to avoid a self-ignition phenomenon by a decompression effect (low compression effect) at the time of warm-up start of the engine. Moreover, the phase shift angle D can be set at an intermediate position between the maximum advance angle (most advanced position) and the maximum retard angle (most retarded position) in accordance with the operating state of the engine.

Next, at step S22, the controller adds the correction value Dx of phase shift angle calculated at step S21 to the value D2 of phase shift angle previously stored at step S16. Then, the controller assigns a new value obtained by this addition, to the phase shift angle D. That is, the current value of phase shift angle D is updated. Then, the controller outputs the updated phase shift angle D, and the program is returned.

As explained above, in this embodiment, since the brush electric motor 12 is used, only the housing 5 of the electric motor 12 is rotated together with the timing sprocket 1. That is, the rotor itself of the electric motor 12 is not always rotated (relative to the housing 5). Therefore, a consumption energy of the engine can be reduced as compared with the case of the earlier technology.

Moreover, in addition to detecting the relative rotational phase angle (phase shift angle) D between the timing sprocket 1 and the cam shaft 2 by means of the general method using the crank angle sensor and the cam angle sensor, the current phase shift angle D can be detected high frequently by using the crank angle sensor and the first and second detectors 53 and 54 of the rotation sensing mechanism 51. Therefore, a more accurate detection can be achieved.

Particularly, in a very-low-speed region at the time of engine cranking and in the low-speed region of engine, the above-mentioned general detecting method has a low detection accuracy because of its infrequent detections. Contrarily, in this embodiment, the rotation sensing mechanism 51 is used in the very-low-speed region at the time of engine cranking and in the low-speed region of engine. Therefore, in these low-speed regions, the high accurate detection of the phase shift angle D can be attained because of its highly frequent detections. As a result, stability and control responsivity of the valve-timing control of intake valve can be improved.

Moreover, since the rotation sensing mechanism 51 is arranged on an inner circumferential side of the locations of the pair of slip rings 48a and 48b and the respective brushes 23a and 23b, i.e., is provided at a radially inner location beyond the locations of the slip rings 48a and 48b and brushes 23a and 23b. Therefore, various influences which are caused by the sliding movements between the respective brushes 23a and 23b and the slip rings 48a and 48b can be avoided.

That is, in a case that the respective detectors 53 and 54 of the rotation sensing mechanism 51 are arranged on an outer circumferential side of the respective brushes 23a and 23b and the slip rings 48a and 48b, abrasion powder generated by the sliding between the respective brushes 23a and 23b and the inside surfaces of slip rings 48a and 48b is dispersed or spattered by a rotational centrifugal force of the housing 5, so that the abrasion powder adheres to the respective detectors 53 and 54. In this case, there is a risk that the detection accuracy is reduced. However, in this embodiment, since the respective detectors 53 and 54 are provided on an inner circumferential side of the respective brushes 23a and 23b and the slip rings 48a and 48b, the abrasion power is dispersed in a radially outer direction of the slip rings 48a and 48b. Therefore, the reduction of detection accuracy of the rotation sensing mechanism 51 due to the abrasion powder can be suppressed.

Moreover, an influence of electromagnetic noise generated at the sliding portions between the slip rings 48a and 48b and the brushes 23a and 23b and an influence of the abrasion power to a magnetic field produced by the electric motor 12 can be suppressed.

Moreover, in this embodiment, the magnetic rotor 52 of the rotation sensing mechanism 51 is formed integrally with the motor output shaft 13. Therefore, a simplification of structure can be achieved, and assembling and manufacturing operations become easy so that a cost reduction can be attained.

Moreover, in this embodiment, the cover member 3 is formed of a nonmagnetic synthetic resin material. Therefore, the first and second detectors 53 and 54 can be attached and buried in the cover member 3. Accordingly, an axial length of the apparatus can be reduced. Also from this point of view, a cost reduction can be attained.

Since the cover member 3 is formed of the synthetic resin material; whole of the engine can be reduced in weight, and the respective slip rings 48a and 48b and the connector terminal 49a or the like can be provided integrally with the cover member 3. Accordingly, a manufacturing operation of these components becomes easy.

Moreover, in this embodiment, the needle bearing 28 of the speed-reduction mechanism 8 is disposed to overlap with the first ball bearing 33 in the radial direction, i.e., is disposed at a substantially same axial location as that of the first ball bearing 33. Furthermore, the needle bearing 28 is disposed to overlap with the annular member 19 and the rollers 34 in the radial direction, i.e., is disposed at the same axial location as those of the annular member 19 and the rollers 34. Therefore, the axial length of the apparatus can be sufficiently shortened. As a result, the apparatus can be reduced in weight and size.

Since the structure of the speed-reduction mechanism 8 is simplified in this embodiment, the manufacturing and assembling operations become easy so that a cost for these operations can be sufficiently reduced.

Moreover, in this embodiment, the needle bearing 28 is located on a radially inner side of the meshing portion (i.e., beyond the meshing location) between the rollers 34 and teeth surfaces of the internal teeth 19a of the annular member 19. Therefore, a high load applied in the radially inner direction from the annular member 19 can be received by the needle bearing 28. Therefore, little bending moment due to this load is applied to the motor output shaft 13. Accordingly, a smooth rotation of the motor output shaft 13 can be constantly obtained.

Moreover, lubricating oil is forcibly supplied through the oil supply hole 46a into the speed-reduction mechanism 8. Therefore, a lubricating performance of respective portions of the speed-reduction mechanism 8 is improved. Since the lubricating oil is supplied to a region between the internal teeth 19a and the rollers 34 and to the needle bearing 28 and the first ball bearing 33, a lubricating performance between the rollers 34, 28b and 34 and the respective balls is also improved so that a smooth phase change is always performed by the speed-reduction mechanism 8. Furthermore, since this lubricating oil also has a shock-absorbing function, a generation of rattle noise can be effectively suppressed.

Particularly, during the driving state of the engine, the speed-reduction mechanism 8 is soaked in lubricating oil because the lubricating oil pumped from the oil pump is constantly supplied through the lubricating-oil supplying section. Hence, a generation of oil-film shortage in the respective rotating members can be suppressed. Therefore, an initial drive load of the electric motor 12 can be sufficiently reduced. In addition, the control responsivity of valve timing is improved while reducing the consumption energy.

Moreover, lubricating oil discharged to the outside through the respective oil discharge holes from the inside of the speed-reduction mechanism 8 adheres to the second ball bearing 43 by the centrifugal force, and also adheres to the respective gear portions 1b of the timing sprocket 1. Thereby, these portions are efficiently lubricated by lubricating oil.

Moreover, in this embodiment, the motor output shaft 13 and the eccentric shaft portion 30 are supported through the needle bearing 28 and the third ball bearing 35 by the cam bolt 10. Therefore, it is unnecessary to provide an additional supporting shaft, so that the number of components can be reduced. Since the these motor output shaft 13 and eccentric shaft portion 30 are rotatably connected with the cam shaft 2 directly in the axial direction, a radial inclination thereof relative to the cam shaft 2 is suppressed so that a high coaxial-position maintaining performance can be ensured.

Moreover, in this embodiment, the speed-reduction mechanism 8 can be integrated with the electric motor 12 by the housing 5. Also, the speed-reduction mechanism 8 can be integrated with the timing sprocket 1 through the sprocket main body 1a. Therefore, a unitization for whole of these structural components can be attained. Accordingly, product management becomes easy while attaining a downsizing of the apparatus in both of the axial and radial directions.

Moreover, in this embodiment, the second oil seal 32 applies frictional resistance to the motor output shaft 13. Therefore, an alternating torque which is generated in the cam shaft 2 due to biasing force of the valve spring and the like is absorbed, so that the load of the electric motor 12 can be suppressed.

Moreover, in this embodiment, the motor output shaft 13 is integrated with the eccentric shaft portion 30. Therefore, as compared with a case where the motor output shaft 13 is separated from the eccentric shaft portion 30, the number of components can be reduced and the assembling and manufacturing operations become easy. Also from this viewpoint, the cost reduction can be achieved.

Although the invention has been described above with reference to certain embodiments of the invention, the invention is not limited to the embodiments described above. Modifications and variations of the embodiments described above will occur to those skilled in the art in light of the above teachings.

For example, the magnetic rotor 52 can be formed as a member separated from the motor output shaft 13. Moreover, the number of targets 52a to 52f can be increased or decreased.

This application is based on prior Japanese Patent Application No. 2010-96581 filed on Apr. 20, 2010. The entire contents of this Japanese Patent Application are hereby incorporated by reference.

The scope of the invention is defined with reference to the following claims.

What is claimed is:

1. A valve-timing control apparatus for an internal combustion engine, comprising:
    a drive rotating member configured to receive a rotational force from a crankshaft;
    a driven rotating member fixed to a cam shaft;
    an electric motor including
        a stator fixed to the driven rotating member,
        a rotor configured to rotate relative to the stator,
        a coil provided to at least one of the stator and the rotor, and configured to rotate the rotor relative to the stator by energization, and
        a motor output shaft fixed to the rotor;
    a speed-reduction mechanism configured to reduce a rotational speed of the motor output shaft and to transmit the reduced rotational speed of the motor output shaft to the driven rotating member;
    a slip ring provided to one of the drive rotating member and a cover member facing the drive rotating member, and configured to feed electric power to the coil;
    a power-feeding brush provided to another of the drive rotating member and the fixed member, and being in contact with the slip ring;
    a detection-target section provided to a tip side of the motor output shaft, and located on an inner circumferential side of the valve-timing control apparatus beyond a contact portion between the slip ring and the power-feeding brush; and
    a detecting section fixed integrally to the cover member, and located radially inward of the slip ring wherein the detecting section is configured to detect a rotational position of the motor output shaft by detecting a position of the detection-target section.

2. The valve-timing control apparatus as claimed in claim 1, wherein
    the detection-target section is provided to the tip side of the motor output shaft, and
    the detecting section is provided to the fixed member.

3. The valve-timing control apparatus as claimed in claim 1, wherein
    the detection-target section is provided to a tip of the motor output shaft.

4. The valve-timing control apparatus as claimed in claim 1, wherein
    the detection-target section is constituted by a plurality of pulse-generating teeth formed to protrude from locations given at substantially even intervals in a circumferential direction of the detection-target section, and
    the detecting section is constituted by a magnetic sensor configured to measure magnetic flux.

5. The valve-timing control apparatus as claimed in claim 1, wherein
    a relative rotational phase of the driven rotating member relative to the drive rotating member is restricted within a predetermined angle range, the relative rotational phase of the driven rotating member relative to the drive rotating member is controlled to a maximum retard side when the engine is stopped, and the relative rotational phase of the driven rotating member relative to the drive rotating member is controlled to be a desired value by driving the electric motor in accordance with at least a temperature state of the engine when the engine is cranked to be restarted.

6. The valve-timing control apparatus as claimed in claim 1, wherein a relative rotational angle of the driven rotating member relative to the drive rotating member is stored in a memory of a control circuit when the engine is stopped, and the electric motor is driven to cause the valve timing to enable a start of the engine when the engine is cranked to be restarted.

7. The valve-timing control apparatus as claimed in claim 1, wherein a relative rotational phase between the drive rotating member and the driven rotating member is controlled to a retard side by rotating the electric motor in a direction opposite to a rotational direction of the cam shaft when the engine is cranked under a warm-up start.

8. The valve-timing control apparatus as claimed in claim 1, wherein the coil is provided to the rotor, and an energized state of the coil is switched by a commutator and a power switching brush abutting on the commutator.

9. The valve-timing control apparatus as claimed in claim 8, wherein the stator includes a permanent magnet having different magnetic poles formed alternately.

10. The valve-timing control apparatus as claimed in claim 8, wherein the detection-target section and the detecting section are provided on an inner circumferential side beyond a contact portion between the commutator and the power switching brush.

11. The valve-timing control apparatus as claimed in claim 1, wherein the cover member covers at least a part of the drive rotating member, and the cover member is fixed to a cylinder head of the internal combustion engine.

12. The valve-timing control apparatus as claimed in claim 11, wherein the cover member is formed of a nonmagnetic material.

13. A valve-timing control apparatus for an internal combustion engine, comprising:

a drive rotating member configured to receive a rotational force from a crankshaft;

a driven rotating member fixed to a cam shaft;

an electric motor including a stator fixed to the driven rotating member, a rotor configured to rotate relative to the stator, a plurality of coils provided to rotate integrally with the rotor and configured to form different magnetic poles in a circumferential direction of the rotor by energization, a commutator configured to switch an energized state of the coils, a power switching brush provided to the drive rotating member and abutting on the commutator, and a motor output shaft fixed to the rotor, and configured to be rotated by energizing the coils through the power switching brush and the commutator;

a speed-reduction mechanism configured to reduce a rotational speed of the motor output shaft and to transmit the reduced rotational speed of the motor output shaft to the driven rotating member;

a detection-target section provided to a tip side of the motor output shaft, and located radially inward of a contact portion between the commutator and the power switching brush with respect to a radial direction of the commutator; and a detecting section fixed integrally to a cover member, and located radially inward of the contact portion between the commutator and the power switching brush with respect to the radial direction of the commutator, wherein the detecting section is configured to detect a rotational position of the motor output shaft by detecting a position of the detection-target section.

14. A valve-timing control apparatus for an internal combustion engine, comprising:

a drive rotating member configured to receive a rotational force from a crankshaft;

a driven rotating member fixed to a cam shaft;

an electric motor including a stator fixed to the driven rotating member, a rotor configured to rotate relative to the stator, a plurality of coils provided to rotate integrally with the rotor and configured to form different magnetic poles in a circumferential direction of the rotor by energization, a commutator configured to switch an energized state of the coils, a power switching brush provided to the drive rotating member and abutting on the commutator, and a motor output shaft fixed to the rotor, and configured to be rotated by energizing the coils through the power switching brush and the commutator;

a speed-reduction mechanism configured to reduce a rotational speed of the motor output shaft and to transmit the reduced rotational speed of the motor output shaft to the driven rotating member;

a slip ring provided to one of the drive rotating member and a cover member facing the drive rotating member, and configured to feed electric power to the power switching brush;

a power-feeding brush provided to another of the drive rotating member and the fixed member, and being in contact with the slip ring, and a detection section located radially inward of the slip ring and configured to detect a rotational position of the motor output shaft on the inner circumferential side beyond a contact portion between the slip ring and the power-feeding brush and beyond a contact portion between the commutator and the power switching brush.

* * * * *